United States Patent [19]
Settelmayer

[11] Patent Number: 6,010,048
[45] Date of Patent: *Jan. 4, 2000

[54] ROOF RACK WITH QUICK RELEASE TOWER ASSEMBLY

[75] Inventor: Joseph J. Settelmayer, Eureka, Calif.

[73] Assignee: Yakima Products, Arcata, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,416

[22] Filed: Jul. 9, 1997

[51] Int. Cl.$^7$ ........................................................ B60R 9/04
[52] U.S. Cl. ........................ 224/321; 224/315; 224/326; 224/322
[58] Field of Search ..................................... 224/309, 314, 224/315, 319, 321, 322, 325, 326, 327, 329, 330, 331

[56] References Cited

U.S. PATENT DOCUMENTS

| | | |
|---|---|---|
| Re. 26,538 | 3/1969 | Bott . |
| Re. 26,539 | 3/1969 | Bott . |
| Re. 32,583 | 1/1988 | Bott . |
| D. 264,203 | 5/1982 | Bott . |
| D. 282,155 | 1/1986 | Bott . |
| D. 310,196 | 8/1990 | Bott . |
| 2,415,286 | 2/1947 | Hyde . |
| 2,431,400 | 11/1947 | Iverson . |
| 2,584,283 | 2/1952 | Oliver et al. . |
| 2,613,020 | 10/1952 | Berry ........................................ 224/331 |
| 3,064,868 | 11/1962 | Treydte . |
| 3,239,115 | 3/1966 | Bott et al. . |
| 3,378,182 | 4/1968 | McMiller . |
| 3,519,180 | 7/1970 | Bott . |

(List continued on next page.)

FOREIGN PATENT DOCUMENTS

| | | | |
|---|---|---|---|
| 971140 | 7/1975 | Canada ..................................... | 224/326 |
| 193501 | 9/1986 | European Pat. Off. ................ | 224/309 |
| 433495 | 6/1991 | European Pat. Off. ................ | 224/322 |
| 2950449 | 6/1981 | Germany ................................. | 224/315 |
| 3034226 | 4/1982 | Germany ................................. | 224/309 |
| 3201409 | 9/1983 | Germany ................................. | 224/315 |
| 3614740 A1 | 11/1987 | Germany . | |
| 3626479 | 2/1988 | Germany ................................. | 224/321 |
| 63-53143 | 8/1986 | Japan ...................................... | 224/309 |
| WO 92/02385 | 2/1992 | WIPO . | |
| WO 94/10007 | 5/1994 | WIPO . | |

(List continued on next page.)

OTHER PUBLICATIONS

Page from *Yakima Car Racks* '97 Catalog.
Three detailed photographs of RailRider Roof Rack, dated Dec. 23, 1998, labeled Exhibit A, Exhibit B, and Exhibit C (on reverse of photo).
Thule Car Rack Systems catalogue 1997.

(List continued on next page.)

*Primary Examiner*—Gregory M. Vidovich
*Attorney, Agent, or Firm*—Kolisch, Hartwell, Dickinson, McCormack & Heuser

[57] ABSTRACT

A roof rack mountable to a vehicle to secure a load over a surface expanse of the vehicle. The rack includes at least one crossbar adapted to extend substantially across the surface expanse. Each end of the crossbar is secured to the vehicle by a tower assembly. Each tower assembly includes a base adapted to be independently locked in place on the vehicle in a position generally adjacent an edge of the surface expanse. A tower body is adapted to be disposed near an end of the crossbar and includes an upper portion configured to secure the tower body to the crossbar and a lower end adapted to be attached to and removed from the base while the base remains locked in place on the vehicle. The base thereby pre-establishes the position of the tower body on the vehicle. A quick release mechanism is adapted to selectively extend between and interconnect the base and tower body when the tower body is attached to the base to allow a user to selectively lock and release the tower body in place on the base. The quick release mechanism can be operated by direct digital manipulation.

19 Claims, 6 Drawing Sheets

U.S. PATENT DOCUMENTS

| | | |
|---|---|---|
| 3,554,416 | 1/1971 | Bott . |
| 3,615,069 | 10/1971 | Bott . |
| 3,643,973 | 2/1972 | Bott . |
| 3,848,785 | 11/1974 | Bott . |
| 3,951,320 | 4/1976 | Bott . |
| 4,015,760 | 4/1977 | Bott . |
| 4,050,616 | 9/1977 | Mosow . |
| 4,055,284 | 10/1977 | Bott . |
| 4,089,448 | 5/1978 | Traeger . |
| 4,099,658 | 7/1978 | Bott . |
| 4,106,680 | 8/1978 | Bott . |
| 4,126,228 | 11/1978 | Bala et al. . |
| 4,156,497 | 5/1979 | Bott . |
| 4,162,755 | 7/1979 | Bott . |
| 4,165,827 | 8/1979 | Bott . |
| 4,170,322 | 10/1979 | Bott . |
| 4,174,794 | 11/1979 | Bott . |
| 4,175,682 | 11/1979 | Bott . |
| 4,182,471 | 1/1980 | Bott . |
| 4,222,508 | 9/1980 | Bott . |
| 4,239,139 | 12/1980 | Bott . |
| 4,269,339 | 5/1981 | Bott . |
| 4,274,568 | 6/1981 | Bott . |
| 4,274,569 | 6/1981 | Winter et al. . |
| 4,274,570 | 6/1981 | Bott . |
| 4,277,009 | 7/1981 | Bott . |
| 4,295,587 | 10/1981 | Bott . |
| 4,323,182 | 4/1982 | Bott . |
| 4,342,411 | 8/1982 | Bott . |
| 4,364,500 | 12/1982 | Bott . |
| 4,372,469 | 2/1983 | Kowalski et al. . |
| 4,427,141 | 1/1984 | Bott . |
| 4,428,517 | 1/1984 | Bott . |
| 4,431,123 | 2/1984 | Bott . |
| 4,432,478 | 2/1984 | Bott . |
| 4,433,804 | 2/1984 | Bott . |
| 4,440,333 | 4/1984 | Bott . |
| 4,442,961 | 4/1984 | Bott . |
| 4,448,336 | 5/1984 | Bott . |
| 4,448,337 | 5/1984 | Cronce ................................... 224/326 |
| 4,460,116 | 7/1984 | Bott . |
| 4,469,261 | 9/1984 | Stapleton et al. ........................ 224/321 |
| 4,473,178 | 9/1984 | Bott . |
| 4,501,385 | 2/1985 | Bott . |
| 4,516,709 | 5/1985 | Bott . |
| 4,586,638 | 5/1986 | Prescott et al. . |
| 4,588,117 | 5/1986 | Bott . |
| 4,640,450 | 2/1987 | Gallion et al. . |
| 4,673,119 | 6/1987 | Bott . |
| 4,684,048 | 8/1987 | Bott . |
| 4,702,401 | 10/1987 | Graber et al. . |
| 4,721,239 | 1/1988 | Gibbs, III et al. ...................... 224/322 |
| 4,754,905 | 7/1988 | Bott . |
| 4,757,929 | 7/1988 | Nelson . |
| 4,770,329 | 9/1988 | Kamaya . |
| 4,838,467 | 6/1989 | Bott et al. . |
| 4,848,112 | 7/1989 | Graber et al. .......................... 224/315 |
| 4,877,168 | 10/1989 | Bott . |
| 4,877,169 | 10/1989 | Grim ....................................... 224/322 |
| 4,887,754 | 12/1989 | Boyer et al. . |
| 4,890,777 | 1/1990 | Bott . |
| 4,899,917 | 2/1990 | Bott . |
| 4,944,439 | 7/1990 | Bott . |
| 4,967,945 | 11/1990 | Bott . |
| 4,972,983 | 11/1990 | Bott . |
| 5,038,988 | 8/1991 | Thulin . |
| 5,052,605 | 10/1991 | Johansson . |
| 5,143,267 | 9/1992 | Cucheran et al. . |
| 5,158,425 | 10/1992 | Bott . |
| 5,201,911 | 4/1993 | Lee ........................................ 224/322 |
| 5,205,453 | 4/1993 | Pudney et al. . |
| 5,232,138 | 8/1993 | Cucheran ............................... 224/321 |
| 5,275,320 | 1/1994 | Duemmler . |
| 5,282,562 | 2/1994 | Legault ................................... 224/326 |
| 5,320,264 | 6/1994 | Weir . |
| 5,326,007 | 7/1994 | Pudney et al. . |
| 5,375,750 | 12/1994 | Mandarino et al. . |
| 5,419,479 | 5/1995 | Evels et al. . |
| 5,476,201 | 12/1995 | Hall et al. . |

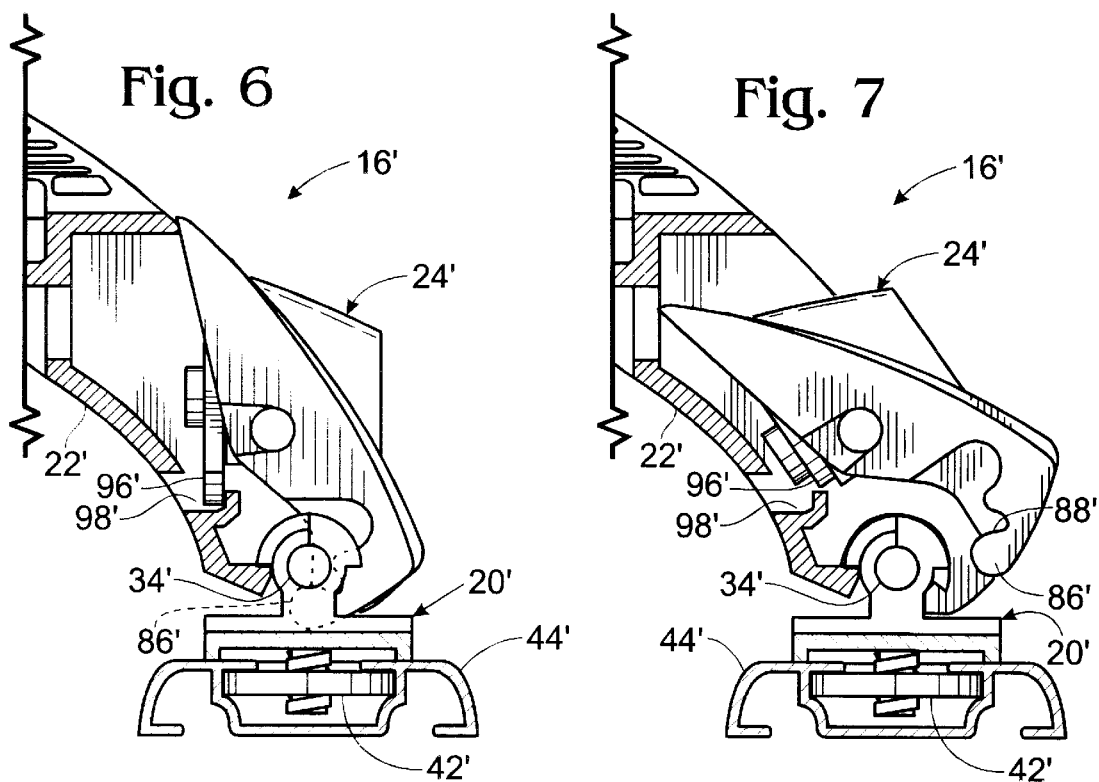
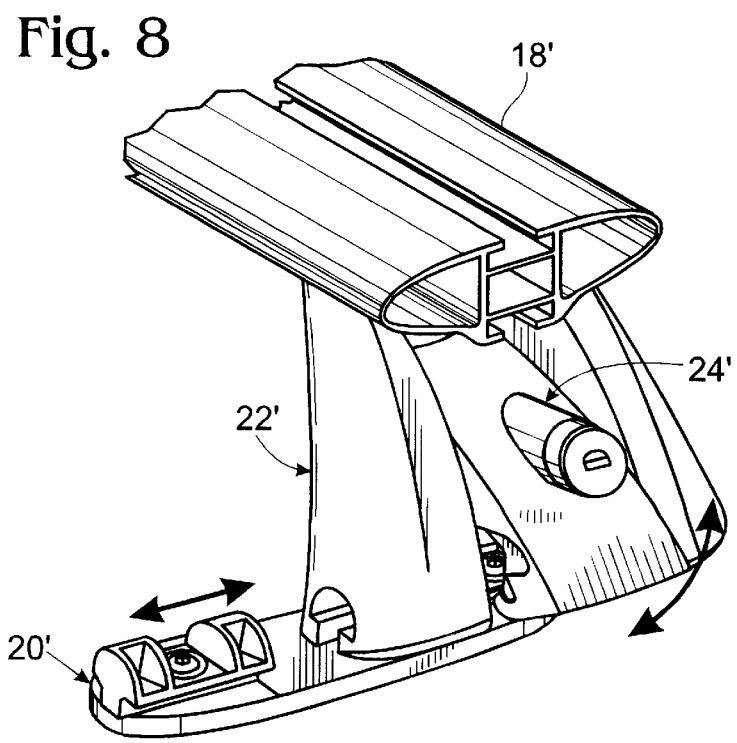

ROOF RACK WITH QUICK RELEASE TOWER ASSEMBLY

FIELD OF THE INVENTION

The present invention relates to load carrying racks, and more particularly to a load carrying rack mountable to a vehicle to secure a load over a surface expanse of the vehicle.

BACKGROUND OF THE INVENTION

In recent years, various types of recreational activities have become increasingly popular, including biking, skiing, snow boarding, camping and boating. People engaging in these activities often must drive from the city where they live to a remote location where they can engage in their chosen recreation. Because these activities all require some type of equipment, participants are faced with the challenge of transporting this equipment to its point of use.

Numerous rack systems have been developed to facilitate transportation of recreational equipment. These racks are typically secured to some location on a vehicle and provide attachment points for the various items of sporting gear. Probably the most common style of rack system mounts to the roof of a vehicle. The fundamental components of such racks are a pair of spaced-apart parallel crossbars supported above the roof of the vehicle by towers disposed at each end of each crossbar. The crossbars provide a standard base to which various accessories are attached to accommodate different loads.

Because most people only use their racks intermittently, they are faced with the problem of what to do with their racks when not in use. Although most racks offer some type of lock, leaving the rack on the vehicle when it is not being used to carry loads creates a risk that the rack will be stolen. In addition, the rack creates additional aerodynamic drag and noise. Some users do not like to clutter the roof of their vehicle with a rack when it is not required. Therefore, many users are faced with the problem of attaching and removing the rack from the vehicle.

With many existing rack systems, installation and removal of the rack is rather difficult. In particular, the attachment mechanism for some racks utilizes many pieces which must be carefully assembled to secure the rack to the roof of the vehicle. Other racks must be precisely positioned on the vehicle to accommodate the particular load to be carried or the structure of the vehicle to which they are attached. For instance, the towers may only fit in one location because of the particular curvature of the roof. In some cases, the accessories attached to the crossbars must also be disassembled from the crossbars to permit the rack to be removed from the roof. For these reasons and others, attaching a roof rack to a vehicle and properly adjusting it to the correct position can be a time consuming and frustrating operation for the user.

With the above problems in mind, it is an object of the present invention to provide a roof rack which can be easily mounted to and removed from a vehicle.

It is another object of the present invention to provide a roof rack that is easily remounted to the same position on the vehicle.

Yet another object of the present invention is to provide a tower assembly that can accommodate roofs of various curvatures.

One more object of the present invention is to provide a roof rack with the above advantages that generates reduced aerodynamic drag and wind noise.

SUMMARY OF THE INVENTION

The present invention is a roof rack mountable to a vehicle to secure a load over a surface expanse of the vehicle. The rack includes at least one crossbar adapted to extend substantially across the surface expanse. Each end of the crossbar is secured to the vehicle by a tower assembly. Each tower assembly includes a base adapted to be independently locked in place on the vehicle in a position inward of an edge of the surface expanse. A tower body is adapted to be disposed near an end of the crossbar and includes an upper portion configured to secure the tower body to the crossbar and a lower end adapted to be attached to and removed from the base while the base remains locked in place on the vehicle. The base thereby pre-establishes the position of the tower body on the vehicle. A quick release mechanism is adapted to selectively extend between and interconnect the base and tower body when the tower body is attached to the base to allow a user to selectively lock and release the tower body in place on the base. The quick release mechanism can be operated by direct digital manipulation.

Many other features, advantages and additional objects of the present invention will be apparent to those versed in the art upon making reference to the detailed description which follows and the accompanying sheets of drawings in which a preferred embodiment incorporating the principles of this invention is disclosed as an illustrative example only.

BRIEF DESCRIPTION OF THE DRAWINGS

FIG. 6 is a cross-sectional view showing a quick release mechanism in the tower assembly of FIG. 5 in the locked position.

FIG. 7 is a cross-sectional view showing the quick release mechanism of FIG. 6 in the open position.

FIG. 8 is an elevational view of the tower assembly of FIG. 5 in the process of mounting to a base secured to a vehicle.

DETAILED DESCRIPTION OF THE PREFERRED EMBODIMENT

Figure 1:
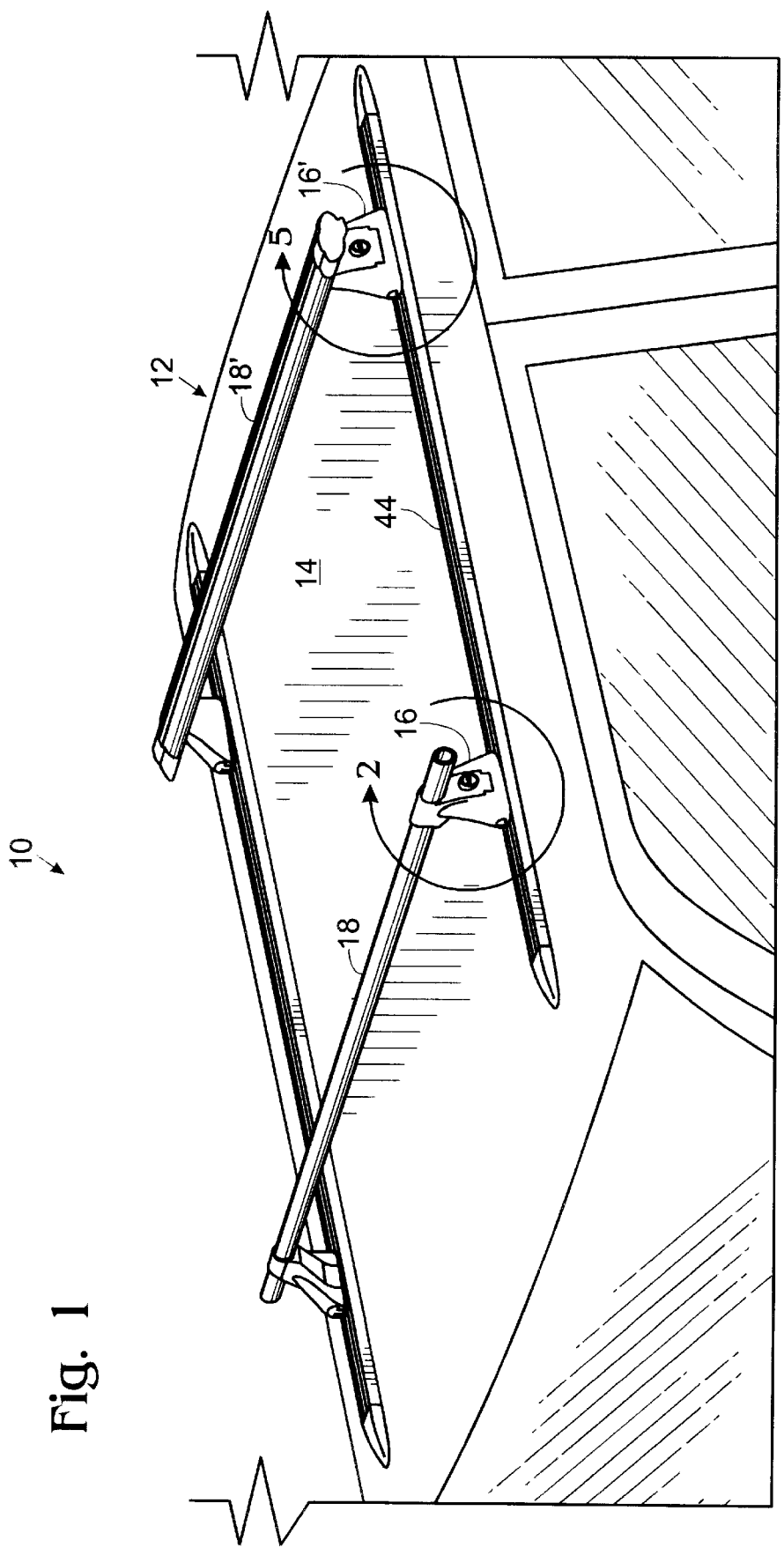
FIG. 1 is a perspective view of two embodiments of a rack according to the present invention.

A roof rack according to the present invention is shown generally at 10 in FIG. 1. Rack 10 is mountable to a vehicle 12 to secure a load over a surface expanse 14 of the vehicle. Rack 10 includes a tower assembly 16 disposed at each end of a crossbar 18 to secure the crossbar to the vehicle. An alternative embodiment of a roof rack according to the present invention is also shown in FIG. 1, which includes a tower assembly 16' disposed at each end of a crossbar 18' to secure the crossbar to the vehicle.

Figure 2:
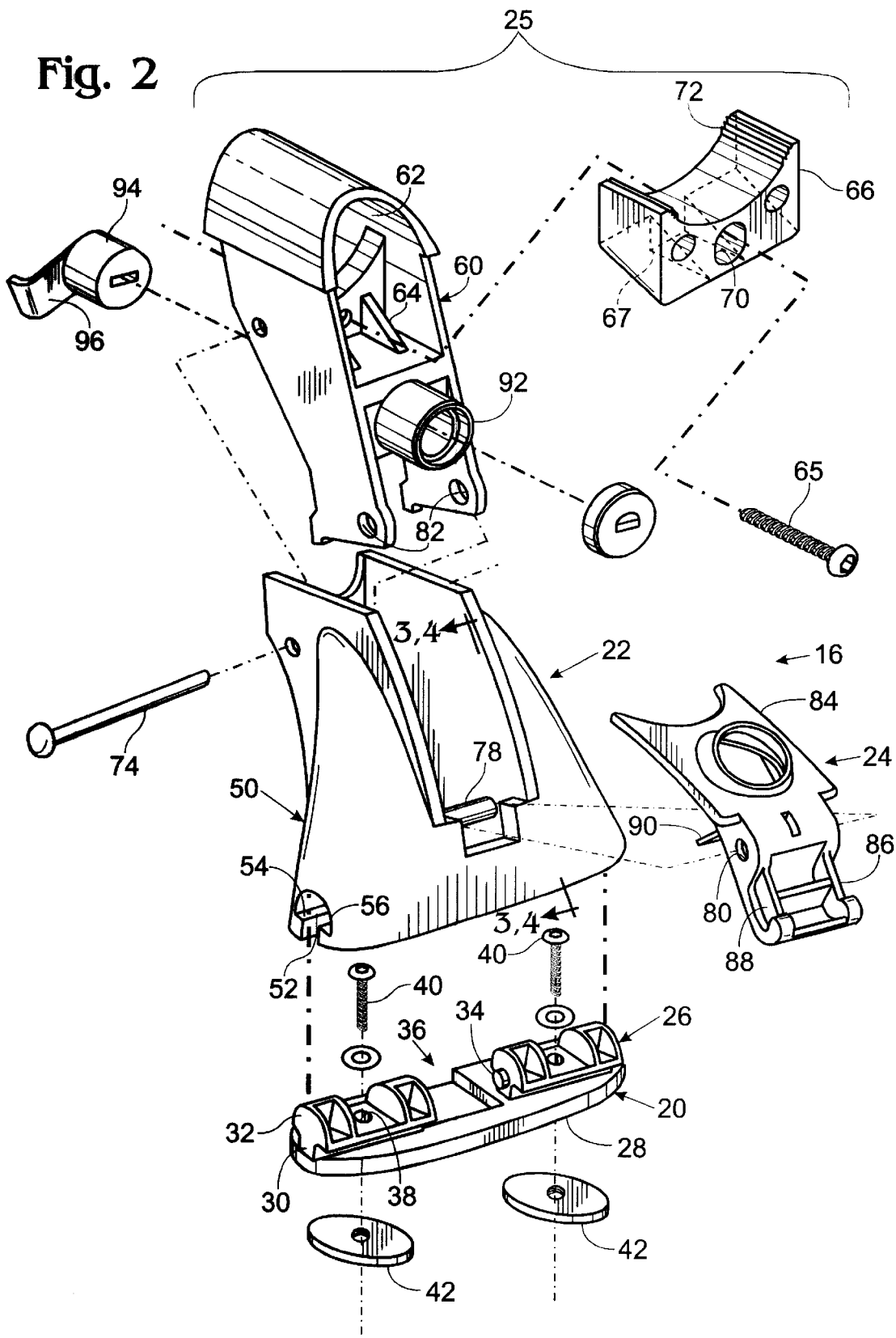
FIG. 2 is an exploded perspective view of a tower assembly according to the present invention.

As shown in FIG. 2, tower assembly 16 includes a molded nylon base 20, a tower body 22, a quick release mechanism 24 and a crossbar clamp 25. Base 20 includes a pair of lugs 26 which project upwardly from a flat platform 28. Lugs 26 each have a neck portion 30 supporting a hemi-cylindrical axle 32. A short stud 34 projects inwardly from axles 32 toward a gap 36 between the lugs. A fastener hole 38 is provided through each lug 26 to pass a screw 40 used to secure the base to the vehicle. It should be noted that screw 40 may take the form of a machine screw engaged in a plate-like oval nut 42 adapted to fit into a track 44 mounted to the top of the vehicle. Track 44 typically includes a gap extending lengthwise along the top of the track, through which gap screw 40 may extend to secure the base to the track. Alternatively, the base may be screwed directly to the surface expanse on the vehicle using a sheet metal screw.

Tower body 22 includes a molded nylon lower end 50 adapted to fit onto base 20. Lower end 50 includes a recessed channel 52 sized to receive the axle on base 20. Channel 52 includes an inner margin 54 and an outer margin 56. Inner margin 54 is positioned to engage the lower surface of axle 32 when the tower body is perpendicular to the base. The outer margin is drooped by about 25-degrees to allow the tower body to pivot inward relative to the base by a corresponding amount to accommodate the roof curvature found on some vehicles.

Tower body 22 further includes an upper portion 60 configured to secure the crossbar. Upper portion 60 includes a cylindrical passage 62 adapted to receive crossbar 18. Disposed on the outboard side of tower body 22 beneath and rising toward passage 62 are two ramp ribs 64. Ramp ribs 64 guide a metal wedge 66 as it is moved toward and away from passage 62 by a screw 65. Wedge 66 includes a lower projection 67 which fits between ribs 64 to help the wedge track on the ribs. As the screw is driven in, it pushes the wedge forward and up ramp ribs 64 and against crossbar 18 to secure the crossbar in the tower body. Wedge 66 is formed with a screw hole 70 shaped to allow the wedge to ride up and down relative to the screw. Wedge 66 also includes a number of teeth 72 to improve the grip of the wedge on the crossbar. It should be noted that crossbar 18 is preferably a metal pipe coated with a slightly resilient polymer, such as marketed by Yakima Products, Inc. of Arcata, Calif., to further enhance the grip of the wedge on the crossbar. In the preferred embodiment, upper portion 60 is formed separately as a cast metal piece to provide good strength and durability, although it could be formed integrally with lower end 50 as well. Upper portion 60 is held in lower end 50 by a rivet 74.

Figure 3:
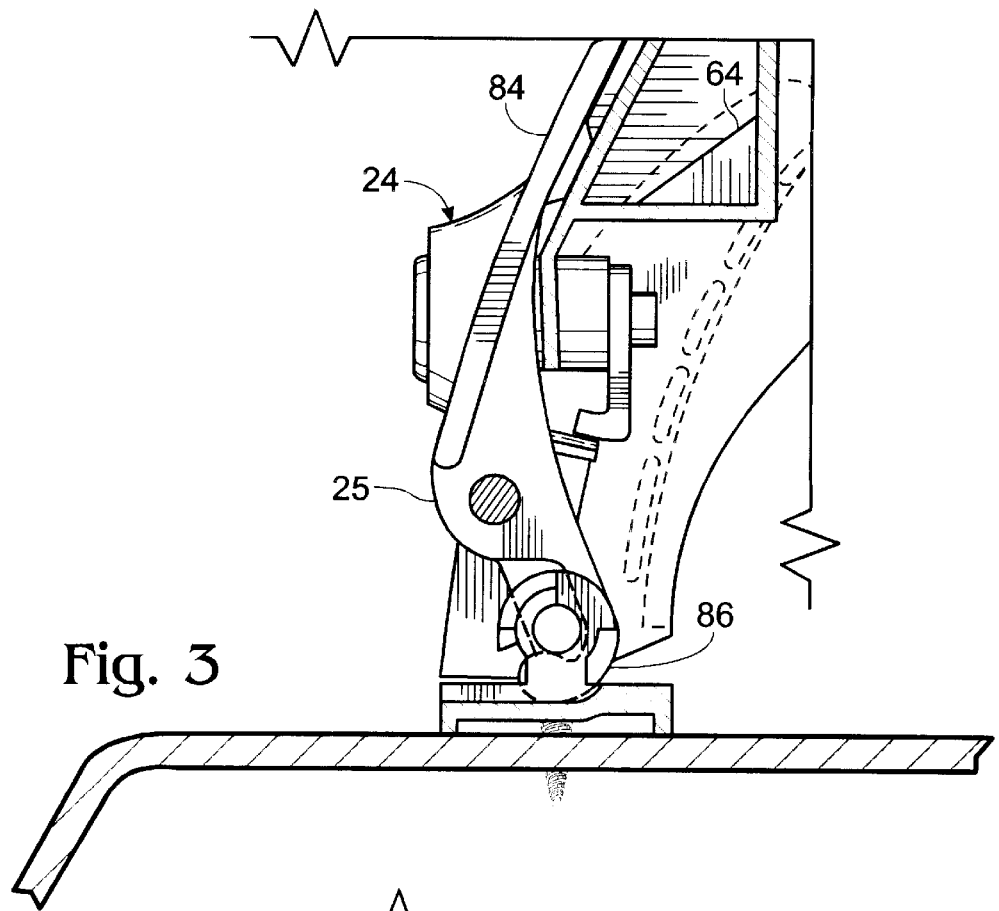
FIG. 3 is a cross-sectional view showing a quick release mechanism in the tower assembly of FIG. 2 in the locked position.
Figure 4:
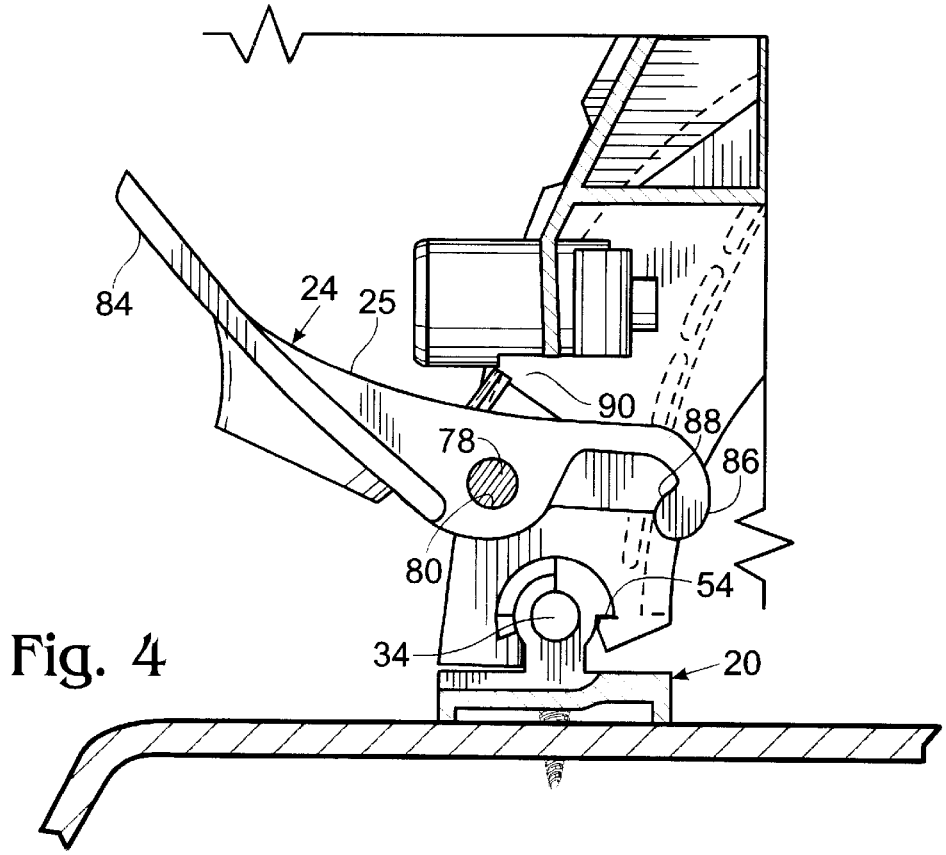
FIG. 4 is a cross-sectional view showing the quick release mechanism of FIG. 3 in the open position.

Quick release mechanism 24 also referred to as latch 24, is shown in additional detail in FIGS. 3 and 4 and includes a lever 25 pivotally mounted to the bottom of upper portion 60 and adapted to selectively extend between and interconnect the base and tower body when the tower body is attached to the base. Quick release mechanism 24 is pivotally mounted to upper portion 60 by a pin 78 which slips through a pivot hole 80 formed through quick release mechanism 24 and opposed holes 82 formed in upper portion 60. The pin is held in place by lower end 50 when the upper portion is assembled with the lower end.

Quick release mechanism 24 includes a handle portion 84 disposed above pivot hole 80 and a pawl portion 86 disposed below pivot hole 80. When the quick release mechanism is in the open or unlatched position, the handle is angled away from the tower body and the pawl is clear of the recessed channel. (See FIG. 4.) In this configuration, the tower body can be slid onto and off of the base as illustrated in FIG. 8. When the tower body is properly positioned on the base, the user can push in on the handle and latch the quick release mechanism. As the handle is pushed in, the pawl is urged into the recessed channel and into the gap between the lugs on the base. In this position, illustrated in FIG. 3, the pawl prevents the tower from shifting on the base, thereby locking the tower in place on the base. It should be noted that the tower body may still be pivoted relative to the base even when the quick release mechanism is closed. The quick release mechanism is latched in the closed position by small recesses 88 disposed on either side of the pawl which catch on studs 34. A significant benefit of the present invention is that the quick release mechanism may be operated by direct digital manipulation. That is, users can simply grasp the handle portion with their fingers and open or close the quick release. Thus, no tools or other accessories are required to install or remove the tower body from the base.

Quick release mechanism 24 is held in the open position by a tab 90 which catches on a lock housing 92 formed in the upper portion. A lock body 94, such as an SKS Lock Core, sold by Yakima Products, Inc., Arcata, Calif., may be installed in the lock housing to allow a user to lock the quick release mechanism in the latched position to prevent theft or unauthorized removal. The lock body includes a lock plate 96 which is pivoted toward or away from tab 90 when the lock is set or released, respectively. When the lock is set, the lock plate engages the tab to prevent the quick release mechanism from pivoting to release the tower body from the base. In addition, because the handle portion covers the end of screw 65, the lock serves to prevent unauthorized removal of the cross arm as well.

Figure 9:
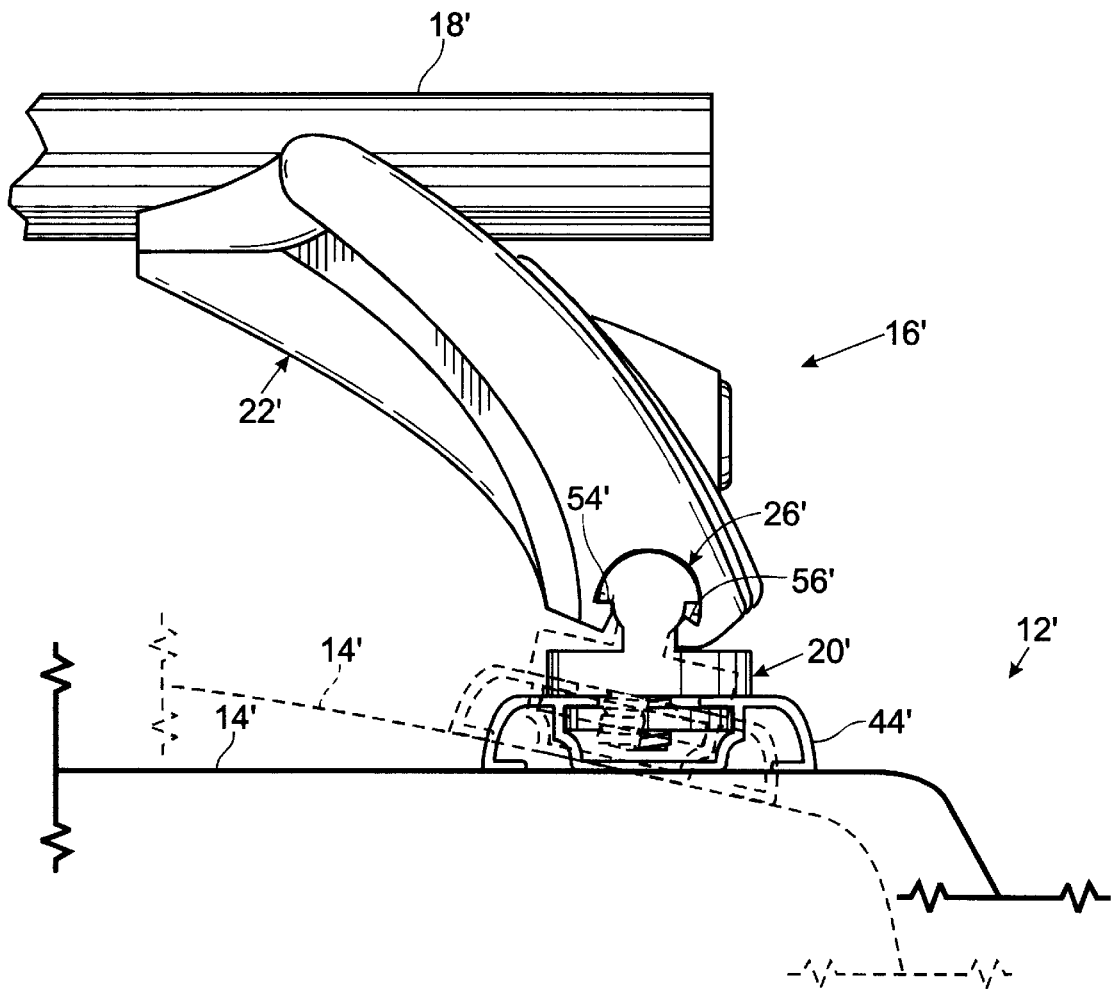
FIG. 9 is a front elevational view of the tower assembly of FIG. 5 showing the pivotal motion of the base.

To install tower assembly 16, the user first mounts the base to the track or directly to the vehicle. After tightening the base in place on the vehicle, the tower body is slid into position on the base as depicted in FIG. 8 and the quick release mechanism is engaged to lock the tower body in place on the base. The crossbar is slipped into the upper portion and clamped in position by operation of wedge 66. The pivotal connection between the base and tower body preferably allows the tower assembly to accommodate a mounting position on the roof that is up to 25-degrees titled from horizontal as shown in FIG. 9.

Once the crossbar is mounted in the proper position in the tower assemblies, both tower assemblies and the crossbar can subsequently be removed and reinstalled as a unit with the crossbar remaining secured to the tower assemblies. By providing a small, low profile base which can remain attached to the vehicle and to which the tower assemblies can be quickly and easily installed, the present invention significantly reduces the effort required to periodically remove and install a rack on a vehicle. Moreover, because the bases remain fixed in place on the vehicle, they serve to pre-establish the proper location for reinstallation of the rack/tower assemblies. When using this system with accessories which attach to both crossbars, such as a bike wheel tray, it is possible to leave the accessories attached to the crossbars while the entire assembled rack is attached to and removed from the vehicle.

Figure 5:
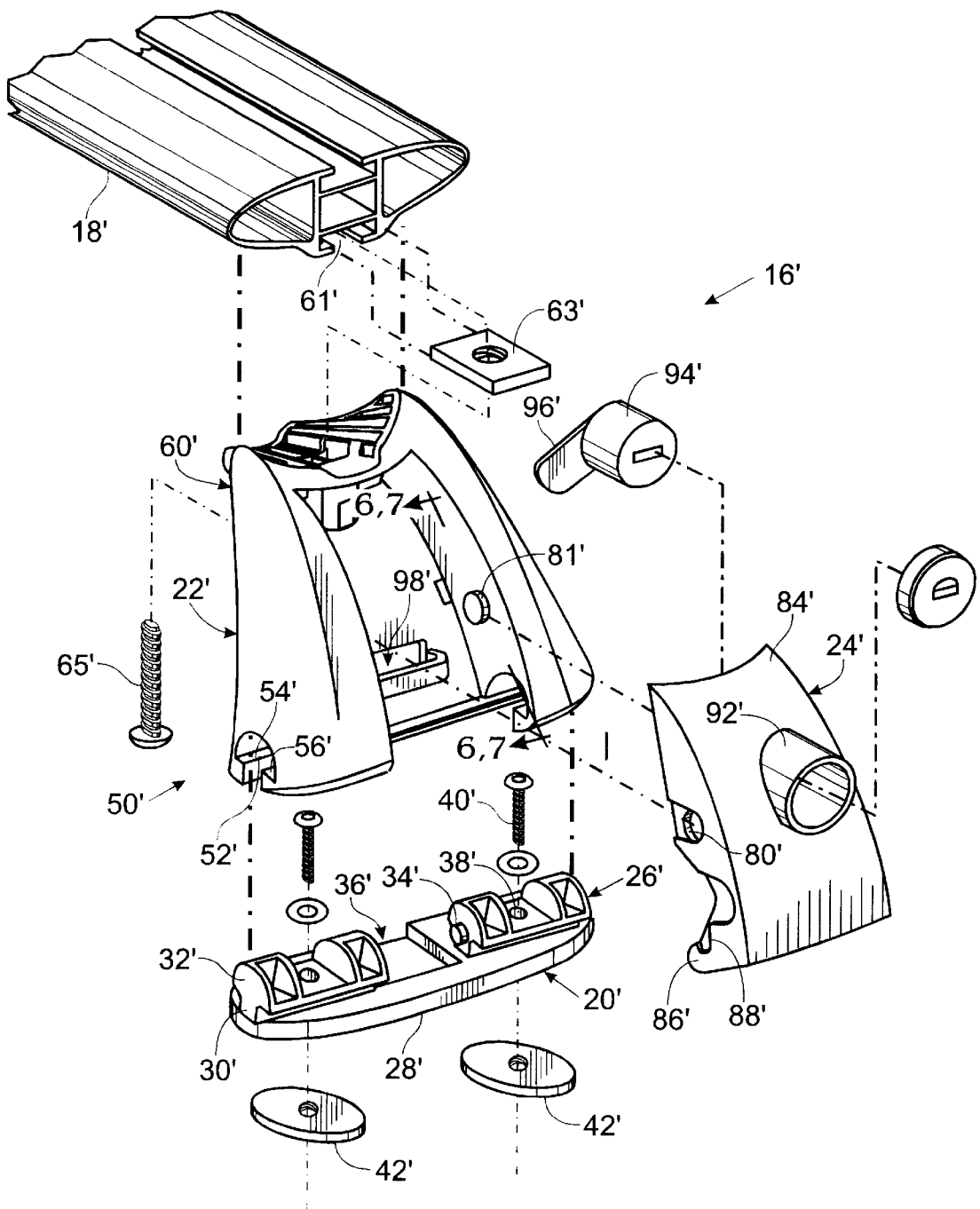
FIG. 5 is an exploded perspective view of an alternative tower assembly according to the present invention.

Tower assembly 16', shown in FIG. 5, is generally similar to tower assembly 16 and the subsequent description will use primed numbers for corresponding structures. Tower assembly 16' includes a base 20' with lugs 26' projecting upwardly from a flat platform 28'. Each lug includes a neck portion 30' supporting a hemicylindrical axle 32'. A short stud 34' projects inwardly from each lug toward a gap 36' between the lugs. A fastener hole 38' passes through each lug to receive a screw 40' used to secure the base to the vehicle as described above.

Tower assembly 16' further includes a tower body 22' with a lower end 50' adapted to mount to base 20'. A recessed channel 52' is formed in lower end 50' to receive lugs 26'. Recessed channel 52' includes inner and outer margins 54', 56', respectively, which serve to limit the pivotal movement of tower body 22' on base 20', as described above and illustrated in FIG. 9.

A quick release mechanism 24' selectively locks the tower body onto the base. Quick release mechanism 24' includes a pivot hole 80' disposed on each side to fit over studs 81' formed in tower body 22'. This allows quick release mechanism 24' to pivot on tower body 22' as shown in FIGS. 6 and 7. The quick release mechanism includes a handle portion 84' and a pawl portion 86' disposed opposite each other. Pawl portion 86' includes a recess 88' on each side to engage studs 34' on lugs to latch the quick release mechanism in the closed position as shown in FIG. 6. To release quick release mechanism 24', the user simply pushes in on the handle portion, which pivots the pawl out of the recessed channel 52' as shown in FIG. 7. With the quick release open, the user can then slide the tower body off the base.

Quick release mechanism 24' includes a lock housing 92' configured to receive a lock body 94'. A lock plate 96' connected to lock body 94' is selectively received by a pocket 98' formed in tower body 22' to lock the quick release mechanism. When lock plate 96' is engaged in the pocket, the quick release mechanism cannot be actuated to release the tower body from the base.

Tower assembly 16' also includes an upper portion 60' which is adapted to secure to crossbar 18'. Upper portion 60' has an upper profile shape to complement the aerodynamic shape of crossbar 18'. Crossbar 18' includes a lower channel 61' which slideably receives flat nut 63'. A screw 65' passes upward through upper portion 60' and into nut 63' and is tightened to secure the crossbar to the tower assembly. It should be noted that upper portion 60' and lower end 50' are formed as a single body in tower assembly 16', rather than the two pieces utilized in tower assembly 16.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower, or equal in scope to the original claims.

I claim:

1. A system for supporting a load-carrying crossbar over a vehicle surface expanse, the system comprising:

an elongate track adapted to be mounted to the vehicle surface expanse, the track including a top surface and a gap in the top surface extending lengthwise along the track;

a base rigidly and detachably supported on the top surface of the track, the base including an axle;

means for rigidly and detachably securing the base to the track; and a tower body detachably mounted to the axle of the base, the tower body being configured to mount to the crossbar and rigidly support the crossbar in an orientation substantially perpendicular to the track, and to be attached to and removed from the base while the base remains rigidly secured to the track and while the crossbar remains rigidly secured to the tower body;

where the tower body is configured to pivot on the axle relative to the base about a pivot axis substantially parallel to the length direction of the track when the base is rigidly secured to the track and the crossbar is mounted rigidly to the tower body, such that the crossbar is adapted to be pivotally adjusted to a level orientation over the vehicle surface expanse to thereby accommodate a curvature that may be present in the vehicle surface expanse; and where the tower body is configured to be attached and removed from the base without removal of the axle from the base.

2. The system of claim 1, where the height of the tower body is substantially greater than the height of the base.

3. The system of claim 1, further comprising:

a latch mounted to the tower body, the latch including a handle, the latch having an engaged configuration in which the latch inseparably interconnects the tower body and base and a released configuration in which the tower body is adapted to be removed from the base, the handle being configured to toggle the latch between the engaged configuration and the released configuration upon direct digital manipulation.

4. The system of claim 1, where the tower body is attached to the base by engagement of the axle and a recess extending at least partially around the axle, and where the tower body is at least partially pivotable relative to the base and is restricted from horizontal or vertical movement relative to the base when the axle and recess are engaged.

5. The tower assembly of claim 4, where the axle is formed integral to the base, and the recess is formed in the tower body.

6. The tower assembly of claim 4, where the tower body base is configured to pivot within a limited angular range relative to the base.

7. The tower assembly of claim 6, where the recess includes an inner margin and an outer margin, and where the axle includes a pair of undercut regions, each of the undercut regions being configured to contact a respective one of the inner margin or outer margin to limit pivoting motion of the tower body to the limited angular range.

8. The tower assembly of claim 6, where the recess includes an inner and outer margin, and the base includes a neck configured to contact each of the inner and outer margin to limit pivoting movement of the tower body to the limited angular range.

9. The system of claim 1, further comprising a lock mechanism configured to lock the tower body to the base.

10. The system of claim 1, where the top surface of the track is substantially flat, and the track further includes an interior channel, and an undercut surface forming a ceiling of the interior channel, the interior channel extending along the length of the track and opening to the gap in the top surface, the track being oriented lengthwise on the vehicle from a rear portion of the surface expanse to a forward portion of the surface expanse, where the base includes a substantially flat bottom configured to rest upon the substantially flat top surface of the track, the means for rigidly and detachably securing comprising:

a screw extending through the gap in the track, a nut positioned within the interior channel, the nut being configured to mount on the screw and gip the undercut surface of the track to secure the base to the track.

11. A system for supporting a load-carrying crossbar over a vehicle surface expanse, the system comprising:

an elongate track adapted to be mounted to the vehicle surface expanse, the elongate track including a top surface and a gap in the top surface extending lengthwise along the track;

a base supported on the top surface of the elongate track, the base having a bottom plate and a neck portion extending upward from the bottom plate, the neck portion being mounted to an axle structure, the bottom plate being attached to the track by a screw mounted to a nut positioned in the gap;

a tower body detachably mounted to the axle structure of the base, the tower body being configured to mount to the crossbar and support the crossbar in an orientation substantially perpendicular to the track, and to be attached to and removed from the base while the base remains rigidly secured to the track and while the crossbar remains secured to the tower body; and a quick release mechanism including an engaged configuration in which the quick release mechanism inseparably interconnects the tower body to the base and a released configuration in which the tower body is adapted to be removed from the base, at least of the quick release mechanism being configured to be positioned adjacent the neck portion and grasp a portion of the axle structure in the engaged configuration, the quick release mechanism also being configured to selectively transition between the engaged configuration and the released configuration upon direct digital manipulation.

12. The system of claim 11, where the quick release mechanism includes a handle configured to be manipulated directly by a hand of a user to select between the engaged configuration and the released configuration.

13. The system of claim 12, where the quick release mechanism includes a pawl portion configured to be toggled by user manipulation of the handle to a position adjacent the base in the engaged configuration such that horizontal and vertical movement of the tower body relative to the base is restricted, and to a position free of the base in the released configuration such that the tower body is adapted to be removed from the base.

14. The system of claim 13, where the quick release mechanism includes a latch and the handle and pawl portion are disposed on opposing ends of the latch.

15. The system of claim 14, where the tower body and the base detachably mount by engagement of the axle structure and a recess structure in the tower body, and the pawl portion is positioned adjacent the axle structure in the engaged configuration.

16. The system of claim 15 where the tower body is configured to at least partially pivot around the axle structure in the engaged configuration.

17. The system of claim 15, where the base includes a second neck portion extending upward from the bottom plate and a second axle structure mounted to the second neck portion, and the pawl portion is positioned intermediate the pair of axle structures in the engaged configuration.

18. A system for supporting a crossbar over a vehicle, the system comprising:

an elongate track mounted to the vehicle, the track including a top portion and a gap in the top portion extending lengthwise along the track;

a base including a bottom portion terminating at each of two opposed ends, the bottom portion being configured to rest upon the top portion of the track and be secured to the track by a fastener extending through the gap in the track, the base further including a longitudinal axis extending between the two opposed ends, and an axle structure generally aligned with the longitudinal axis;

a tower body mounted to the axle structure of the base, the tower body being configured to mount to the crossbar and pivot at least partially about the longitudinal axis on the axle structure;

a quick release mechanism including a pawl portion and a handle, the quick release mechanism being mounted to the tower body, where the pawl portion is configured to toggle to a position adjacent the axle structure and secure to the axle structure in the tower body when the handle is manipulated in one direction, and toggle away from the axle structure to allow the tower body to be removed from the axle structure when the handle is manipulated in another direction; and where the quick release mechanism is pivotally mounted to the tower body, and the pawl portion is configured to rotate into and out of the position adjacent the axle structure.

19. A method for mounting a crossbar to a vehicle, where the vehicle includes a curved roof and a pair of elongate tracks mounted to the roof, the method comprising:

providing a pair of bases, each base including an axle;

providing a pair of tower bodies, each tower body including a lower portion configured to detachably mount to a respective base, and an upper portion configured to grip and secure the crossbar, where the tower body is configured to pivot relative to the base and to be otherwise restricted from movement when the tower body is mounted to the base;

positioning each of the pair of bases in a respective fixed position on a respective one of the pair of tracks;

securing each of the bases on the respective one of the pair of tracks;

mounting each of the tower bodies on the axle of a respective one of the bases, without removing the axle of the respective base;

pivoting each tower body about a respective one of the axles such that the crossbar may be aligned on each of the tower bodies in a horizontal orientation over the curved roof; and securing the crossbar to each of the tower bodies.

* * * * *

Disclaimer and Dedication 6,010,048 — Joseph J. Settelmayer, Eureka, CA. ROOF RACK WTIH QUICK RELEASE TOWER ASSEMBLY. Patent dated January 4, 2000. Disclaimer and Dedication filed March 2, 2000, by the assignee, Yakima Products.

Hereby disclaims and dedicates to the public the entire term of said patent.
*(Official Gazette,* April 18, 2000)